United States Patent [19]

Ohnishi et al.

[11] Patent Number: 4,863,196
[45] Date of Patent: Sep. 5, 1989

[54] CERTIFICATION IDENTIFYING MEDIUM

[75] Inventors: Kazuhiko Ohnishi; Seishi Naito, both of Himeji, Japan

[73] Assignee: Glory Kogyo Kabushiki Kaisha, Hyogo, Japan

[21] Appl. No.: 293,538

[22] Filed: Jan. 4, 1989

Related U.S. Application Data

[63] Continuation of Ser. No. 122,596, Nov. 20, 1987, abandoned, which is a continuation of Ser. No. 866,130, May 22, 1986, abandoned.

[51] Int. Cl.[4] ............................................. B42D 15/00
[52] U.S. Cl. ....................................... 283/82; 283/94; 283/904
[58] Field of Search ...................... 283/82, 91, 94, 904

[56] References Cited

U.S. PATENT DOCUMENTS

| 3,878,367 | 4/1975 | Fayling et al. | 283/904 X |
| 3,902,262 | 9/1975 | Colegrove et al. | 283/904 X |
| 4,044,231 | 8/1977 | Beck et al. | 283/904 X |
| 4,507,550 | 3/1985 | Fleer | 283/904 X |

Primary Examiner—Paul A. Bell
Attorney, Agent, or Firm—Koda and Androlia

[57] ABSTRACT

A certification identifying medium such as debit card or credit card comprising a substrate preferably made of a paper material, a bar code band printed or layered on the substrate with a material including a magnetic material provided with a specific coercive force and a magnetic record band disposed on the substrate to magnetically record information of the bar code. A mask band made of a non-magnetic material is applied to the substrate to cover at least the bar code band to prevent the visual observation thereof. The bar code band generally comprises a plurality of bar codes which have the specific coercive force different from each other.

3 Claims, 4 Drawing Sheets

CERTIFICATION IDENTIFYING MEDIUM

This is a continuation of application Ser. No. 122,596, filed Nov. 20, 1987, now abandoned, which is a continuation of application Ser. No. 866,130, filed May 22, 1986 now abandoned.

BACKGROUND OF THE INVENTION

This invention relates to a certification identifying medium prepared to obviate the possibility of an alternation of an identification medium, such as money or prepaid card, check, credit card and the like, which requires certification for preventing the forgery or falsification of the identification medium.

Usually, money or prepaid cards, or debit cards, checks, credit cards, identification cards, admission tickets and the like are prepared and used widely by describing necessary items or informations such as numbers, names, amounts of money and the like on a substrate such as paper or plastic plate by means of printing operation, magnetically recording these items or informations on the substrate by bonding a magnetic tape, or bonding certifying information such as portrait photograph and applying a tally impression. The thus made identification medium, however, is easily altered to obtain a false certification by forging or falsifying the same.

SUMMARY OF THE INVENTION

An object of this invention is to provide an improved certification identifying medium capable of preventing the medium from being forged or falsified by locating a bar code band made of magnetic materials provided with a specific magnetic coercive force and a mask band covering the bar code band for preventing the visual observation thereof.

This and other object can be achieved, according to this invention, by providing a certification identifying medium comprising a substrate, a bar code band printed on the substrate or layered thereon by a material including magnetic materials provided with a specific coercive force, a magnetic record band disposed on the substrate to magnetically record information of the bar code band, and a mask band made of a non-magnetic material applied to the substrate to cover at least the bar code band to prevent the visual observation thereof. According to the construction of the certification identifying medium of this invention, the intended alternation of such medium such as forgery or falsification can be completely prevented.

The nature, principle and utility of the invention will become more apparent from the following detailed description when read in conjunction with the accompanying drawings.

DESCRIPTION OF THE PREFERRED EMBODIMENT

Figure 1:
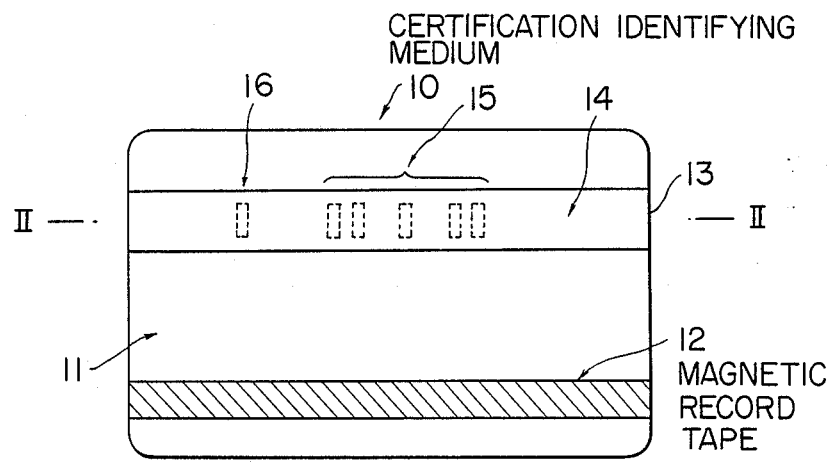
FIG. 1 shows a plan view an example of a certification identifying medium according to this invention.

Referring to FIG. 1 showing an example of a certification identifying medium according to this invention, a substrate 11 of a rectangular card shape of the certification identifying medium 10 is made of a paper material, and on the front surface of the substrate 11, a stripe of magnetic record tape 12 as a magnetic recording band of a known type is bonded or layered at a portion shown in FIG. 1.

Figure 2:
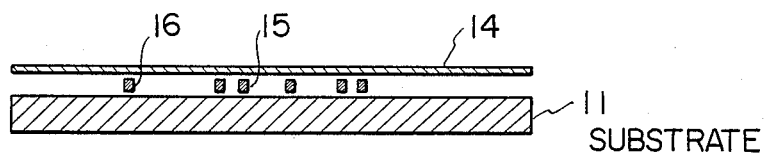
FIG. 2 shows a sectional view taken along the line II—II shown in FIG. 1.

As is shown in FIG. 2, which is a cross sectional view of the certification identifying medium 10 shown in FIG. 1, informations represented by the first and second bar codes 15 and 16, described in detail hereinafter, are magnetically recorded to the magnetic record tape 12 and other items or informations such as numbers, names, publishers, amounts of money may be also recorded as ocassion demands.

Figure 3:
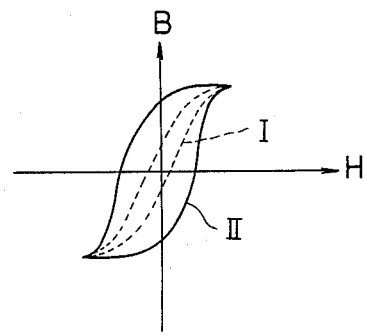
FIG. 3 shows a graph representing an example of magnetic characteristics of magnetic materials contained in printing mediums of bar codes recorded on the identifying medium.

The bar codes 15 and 16 are press-printed at the front surface of the printing stripe portion 13 of the substrate 11. The first bar code 15 is printed (or layered) on the substrate 11 with an ink containing a magnetic material provided with a specific coercive force (for example, characteristic I as shown in FIG. 3) to print a binarized pattern, and the certification identifying mediums are usually prepared so as to have binarized patterns which are respectively different from each other. The second bar code 16 is also printed (or layered) on the substrate 11 with an ink containing magnetic materials provided with a specific coercive force (for example, characteristic II as shown in FIG. 3) which is higher (or lower) than that of the first bar code 15. The second bar code 16 is located at the predetermined position with a binarized pattern common to all identification mediums. The print stripe portion 13 on which the first and second bar codes 15 and 16 are printed is covered by a mask band 14 made of an opaque and non-magnetic material so that the user of the certification identifying medium 10 and the other persons cannot recognize the existance of the bar codes 15 and 16 beneath the mask band 14. The mask band 14 may be disposed so as to cover the whole surface of the substrate 11, and in addition, appropriate figures, photographs or letters may be printed on the surface of the mask band 14.

Figure 4A:
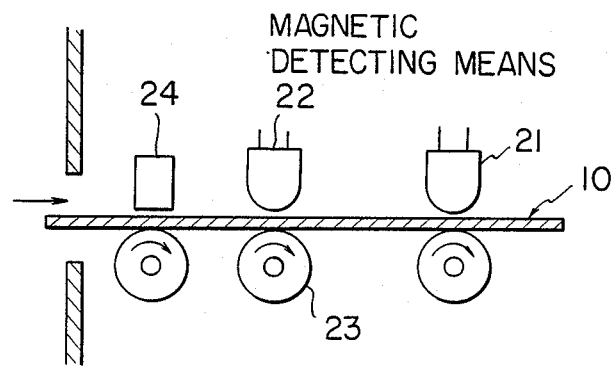
FIG. 4A shows a brief sectional view of an insertion part of a read-out device for the certification identifying medium.
Figure 4B:
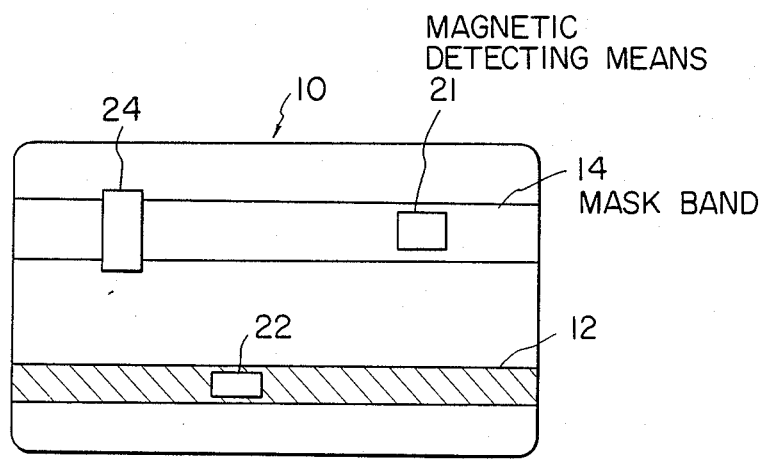
FIG. 4B shows a brief plan view showing location of read-out means at the portion corresponding to that shown in FIG. 4A.
Figure 5:
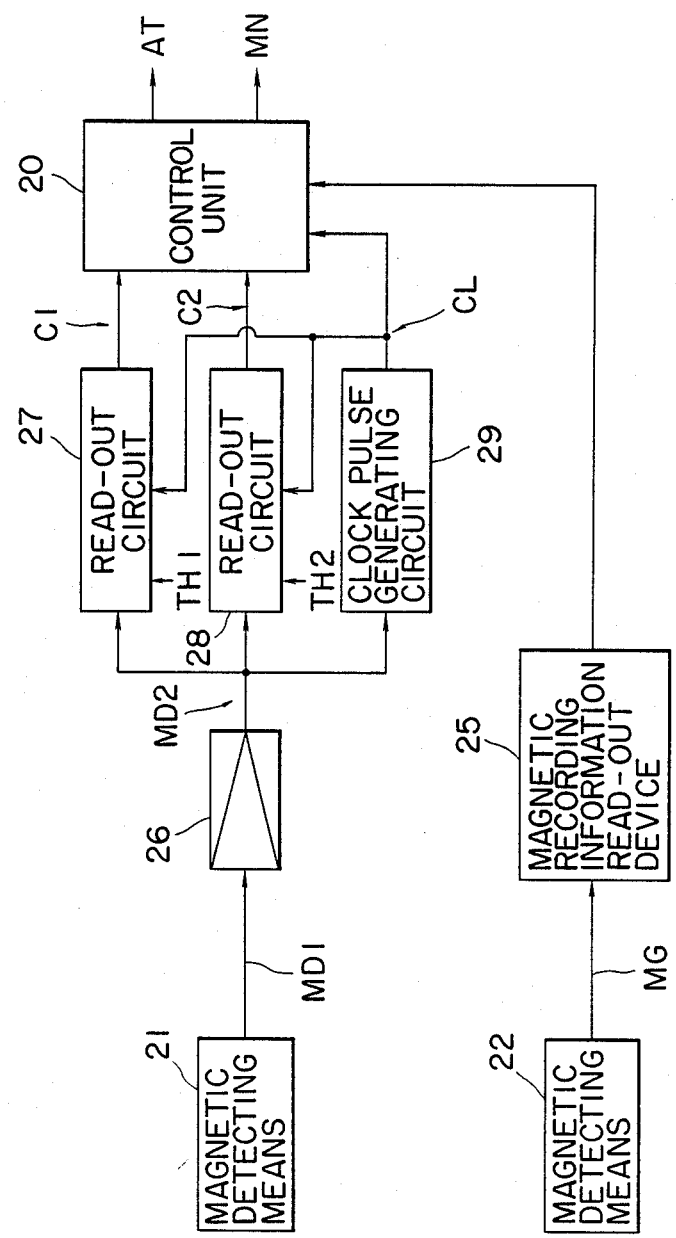
FIG. 5 is a block diagram which shows one example of a read-out device for the certification identifying medium.

The data or informations recorded on the certification identifying medium 10 having construction described hereinbefore will be read out by a read-out device such as represented by FIGS. 4A, 4B and FIG. 5.

Take-in rollers 23 are located at a take-in (or out) portion through which the certification identifying medium 10 is inserted into the read-out device. A magnetizing means 24 and magnetic detecting means 22 and 21 are located at positions in this order from the insertion opening of read-out device towards the inside thereof so that, when the certification identifying medium 10 is inserted into the opening as shown in FIG. 4A, the magnetizing means 24 made of such as a permanent magnet is located above the print stripe portion 14, the magnetic detecting means 22 is located above the magnetic recording tape 12, and the magnetic detecting means 21 is also located above the print stripe portion 14, respectively. The location of these means after the insertion of the medium 10 will be briefly illustrated in FIG. 4B. The magnetic detecting means 21 generates a detection signal MD1 which is inputted into an amplifier 26 and a signal MD2 from the amplifier 26 is then inputted into a read-out circuit 27 of a threshold TH1, a read-out circuit 28 of a threshold TH2 and a clock pulse generating circuit 29. A clock pulse CL from the clock pulse generating circuit 29 is then inputted into a control unit 20 essentially consisting of the read-out circuits 27 and 28, a central processing unit (CPU) and so on.

Signals C1 and C2 regarding the read-out results in the read-out circuit 27 and 28 are inputted therefrom into the control unit 20 and the clock pulse CL is also inputted into the control unit 20 to carry out the synchronized operation. The magnetic detecting means 24 generates a detection signal MG which is then read out by a magnetic record information read-out circuit 25 and a signal transmitted from the read-out circuit 25 is inputted into the control unit 20. In response to these signals, the control unit 20 generates a certification signal AT and outputs a magnetic record information signal MN as shown in FIG. 5.

According to the circuit construction described hereinabove, the operation will be explained hereunder with reference to the timing chart shown in FIG. 6.

When the certification identifying medium 10 is inserted into the read-out device, the bar codes 15 and 16 are successively magnetized by the magnetizing means 24 through the mask band 14, and in this time, the bar codes 15 and 16 are magnetized so as to have the characteristics I and II respectively shown in FIG. 3 thereby to exhibit the coercive forces H different from each other. In accordance with the advance of the certification identifying medium 10 into the inside of the read-out device, the magnetic detecting means 22 detects the recorded information of the magnetic record pattern portion 12 passing beneath the magnetic detecting means 22, and the detecting signal MG from the magnetic detecting means 22 is read-out by the magnetic recorded information read-out circuit 25 and then transmitted into the control unit 20. Thus, the informations of the bar codes 15 and 16 and the other items or informations recorded in the magnetic recorded information pattern portion 12 are read out.

Figure 6:
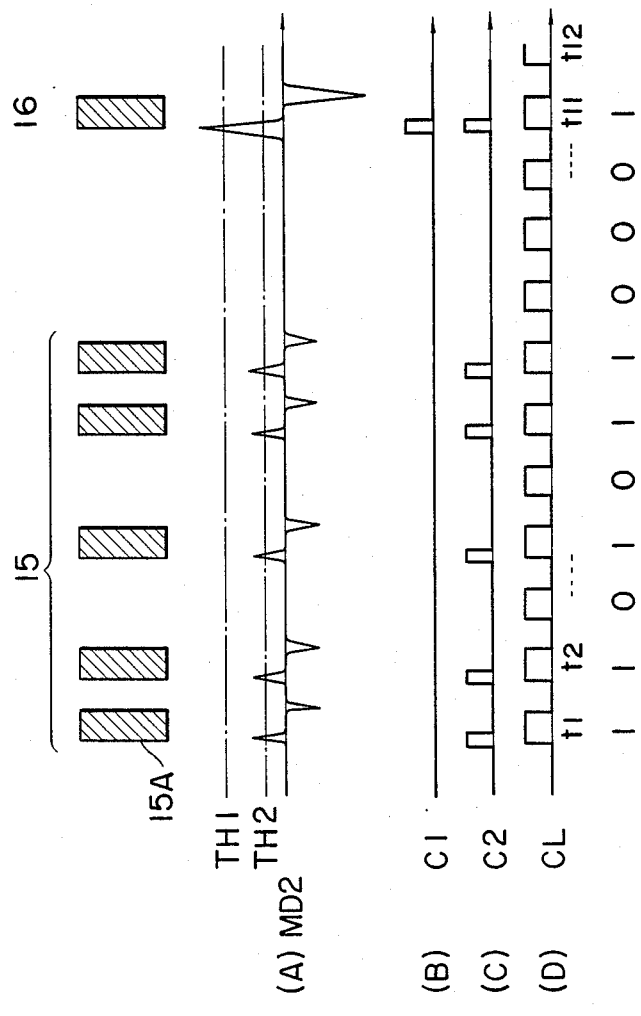
FIG. 6 shows timing charts representing the operation mode of the read out device shown in FIG. 5.

The bar codes 15 and 16 magnetized by the magnetizing means 24 are detected in accordance with the advance of the identifying medium 10 by the magnetic detecting means 21, and in other words, the magnetic detecting means 21 detects the residual magnetisms of the bar codes 15 and 16, which are then amplified by the amplifier 26 to output the detection signal MD2 which is risen up or fallen down response to the variation of the magnetic flux at the front and rear ends of the bar codes such as shown in a part (A) of FIG. 6. The clock pulse generating circuit 29 detects the bar code 15 of the first bit (at a time t1) and then outputs the clock pulse CL as shown in a part (D) of FIG. 6. The threshold TH1 of the read-out circuit 27 is set to a high level and on the other hand the threshold TH2 of the read-out circuit 28 is set to a low level as shown in a part (A) of FIG. 6. On the basis of these settings, the read-out circuit 27 detects a pulse of the detection signal MD2 larger than the threshold TH1 in response to the clock pulse CL thereby to read out the informations of the bar codes 15 and 16 and then generate a clock pulse C1 as shown in a part (B) of FIG. 6. The read-out circuit 28 also detects a pulse of the detection signal MD2 larger than the threshold TH2 and then generates a clock pulse C2 as shown in a part (C) of FIG. 6. With these operation, it will have to be understood that the level of the detection signal MD2 corresponding to the bar code 16 becomes large and that corresponding to the bar code 15 becomes small. Accordingly, the read-out circuit 27 can read out only the information of the bar code 16, whereas the read-out circuit 28 can read out the informations of the bar codes 15 and 16 by setting the threshold TH1 of the read-out circuit 27 to be larger than the pulse level of the bar code 15 and smaller than that of the bar code 16 and setting the threshold TH2 to be smaller than the pulse level of the bar code 16.

The control unit 20 collates the informations C2 of the bar codes 15 and 16 read out by the read-out circuit 28 with the informations of the bar codes 15 and 16 transmitted from the magnetic recorded information read-out circuit 25 and generates the certification signal AT provided that the information of the bar code 16 was read out by the read-out circuit 27. The magnetic recorded informations MN regarding items read out from the magnetic record tape 12 is also outputted. The generation of the certification signal AT from the control unit 20 prooves such identification as that the medium 10 used is not forged or falsified. If forgery of the certification identifying medium 10 is made only by reading out the magnetic recorded tape 12, this forgery can be discriminated because the bar codes 15 and 16 cannot be read out, and also, if the mask band 14 is scraped from the certification identifying medium 10 and another information is magnetically copied, the coercive force difference between the bar codes 15 and 16 is not detected, thus discriminating the forgery or alternation of the medium 10.

The certification identifying medium 10 may be utilized for any certificate or identification materials such as an official license, a bank book or an indentity cards except those described herein before. The bar codes 15 and 16 may be of course provided with the coercive forces having intensities reverse to those described before and it is only required for the bar codes 15 and 16 to have a difference in their coercive forces which can be read out by two read-out circuits. Moreover, further bar codes such as the third and fourth bar codes may be provided for the medium. In addition, although all requirements or items are provided on one surface of the medium in the foregoing embodiment, these requirement or items may be provided on both surfaces of the medium to read out the informations regardless of the inserting direction of the medium into a read-out device.

According to the certification identifying medium of this invention these prepared as described above, intended alternations of the medium made by copying the same with magnetic ink or bonding magnetic tape thereon, for example, can be easily found out. The utilization of the paper-made substrate makes it possible to produce the mediums with low cost, thus being economical. In addition, the medium of this invention can be utilized for such as a money or prepaid card, or debit card which will not be used again after it has been one used.

It should be understood that many modifications and adaptations of the invention will become apparent to those skilled in the art and it is intended to encompass such obvious modifications and changes in the scope of the claims appended hereto.

What is claimed is:

1. A certification identifying medium comprising:
    a substrate of a rectangular card shape which is made of a paper material;
    a bar code band having a first bar code made of magnetizable material having a first coercive force and a second bar code made of magnetizable material having a second coercive force which is higher than that of the magnetizable material of the first bar code, and said bar code band being disposed on a surface of said substrate with said first bar code being printed at first predetermined positions on said substrate as a binary pattern which is different for each certification identifying medium and said second bar code being printed at second predetermined positions on said substrate as a binary pattern which is the same for all certification identifying medium;
    a magnetic record band disposed on a surface of said substrate to magnetically record information of the first and second bar codes; and
    a mask band made of a non-magnetic material applied to said substrate to cover at least said bar code band so as to prevent a visual observation of the first and the second bar codes.

2. The medium according to claim 1 wherein said bar code band and said magnetic record band are disposed on front and rear surfaces of said substrate respectively.

3. A certification identifying medium comprising:
    a substrate of a rectangular card shape which is made of a paper material;
    a bar code band provided by a first bar code made of magnetizable material having a first coercive force and by a second bar code made of magnetizable material having a second coercive force which is higher than that of the magnetizable material of the first bar code, and said bar code band being disposed on a surface of said substrate with said first bar code being layered at first predetermined positions on said substrate as a binary pattern which is different for each certification identifying medium and said second bar code being layered at second predetermined positions on said substrate as a binary pattern which is the same for all certification identifying medium;
    a magnetic record band disposed on a surface of said substrate to magnetically record information of said first and said second bar codes; and
    a mask band made of a non-magnetic material applied to said substrate to cover at least said bar code band so as to prevent a visual observation of said first and said second bar codes.

* * * * *